No. 864,645. PATENTED AUG. 27, 1907.
F. C. B. HILKEMEIER.
EGG TRAPPING HEN'S NEST.
APPLICATION FILED JULY 19, 1906.

2 SHEETS—SHEET 1.

Witnesses
Inventor
F. C. B. Hilkemeier.
By Chandler & Chandler
Attorneys

No. 864,645. PATENTED AUG. 27, 1907.
F. C. B. HILKEMEIER.
EGG TRAPPING HEN'S NEST.
APPLICATION FILED JULY 19, 1906.

2 SHEETS—SHEET 2.

Witnesses

Inventor
F.C.B. Hilkemeier
By
Attorneys

UNITED STATES PATENT OFFICE.

FRIEDRICH C. B. HILKEMEIER, OF TULARE, SOUTH DAKOTA.

EGG-TRAPPING HEN'S NEST.

No. 864,645.      Specification of Letters Patent.      Patented Aug. 27, 1907.

Application filed July 19, 1906. Serial No. 326,955.

*To all whom it may concern:*

Be it known that I, FRIEDRICH C. B. HILKEMEIER, a citizen of the United States, residing at Tulare, in the county of Spink, State of South Dakota, have invented certain new and useful Improvements in Egg-Trapping Hens' Nests; and I do hereby declare the following to be a full, clear, and exact description of the invention, such as will enable others skilled in the art to which it appertains to make and use the same.

This invention has relation to hen's nests in which the eggs are, immediately upon being laid, trapped into a compartment separate from the nest so as to prevent the hen from eating the eggs and to permit the eggs to be gathered without disturbing a hen that might happen to be on the nest.

It is the object of my invention to provide a trap nest that shall be of a construction similar to that that a hen would naturally make for herself, and at the same time be exceedingly simple and of little cost to make.

Moreover, it is my object to provide a nest of such construction that there will be no liability of the breakage of eggs in trapping them into the collection chamber.

It is well known by those who understand the raising of poultry and the habits of hens that some hens will not sit upon and lay eggs in nests that are distinctly artificial; that they select, when left to themselves, nests in hay and straw, if they can find it; and that oftentimes, when they cannot find a nest of hay or straw they will drop their eggs on the ground, when they will either themselves eat them or they will be eaten by other hens or fowls. Taking advantage of this fact, it is made one of the primary ends of my improvements to have the lining of the nest made of hay or straw.

Figure 1:
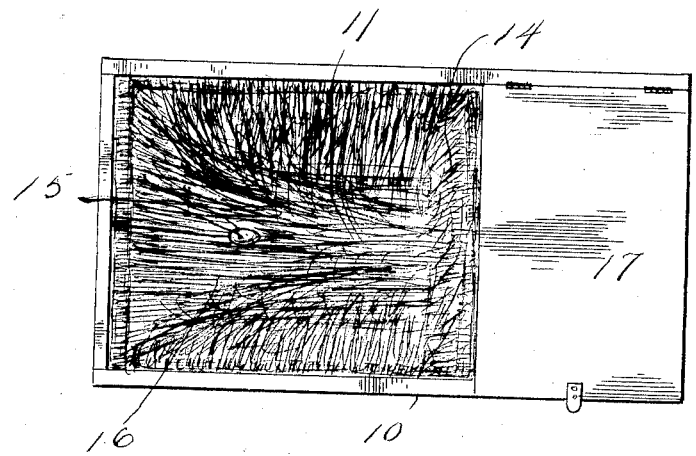
Figure 2:
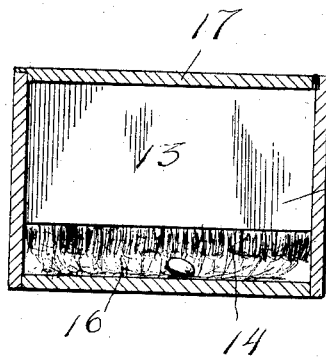
Figure 3:
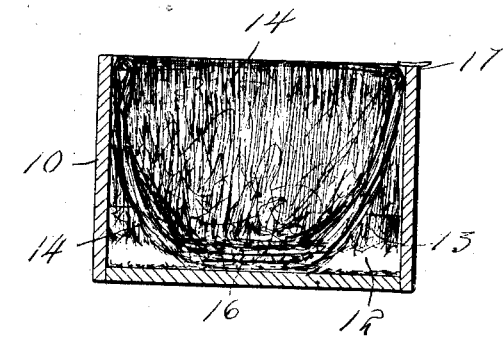
Figure 4:
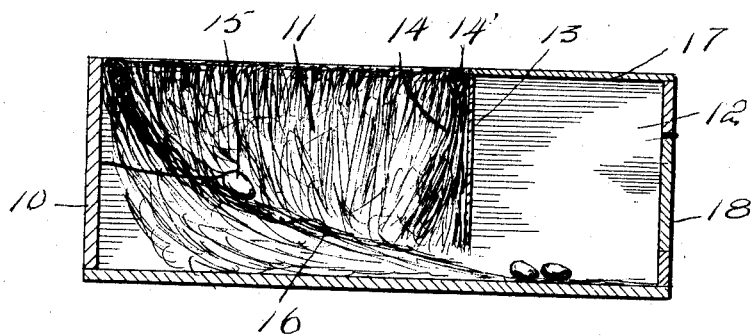
Figure 5:
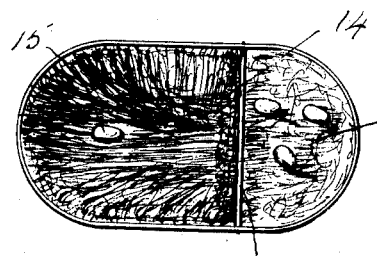
Figure 6:
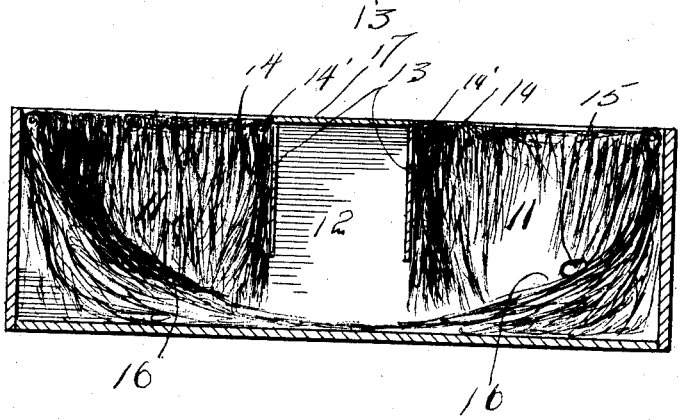
Figure 7:
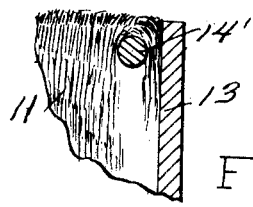

The invention is clearly illustrated in the annexed drawings, forming a part of this specification, in which, Figure 1 is a plan of the invention. Fig. 2 is a transverse section through the egg-collecting chamber adjacent to the partition, looking toward the latter. Fig. 3 is a transverse section through the nest chamber. Fig. 4 is a vertical longitudinal sectional view. Fig. 5 is a plan of the device, showing its form when made of sheet metal. Fig. 6 is a vertical longitudinal sectional view of a modified form. Fig. 7 is an enlarged section detail view, showing the manner in which the hay or straw is supported to line the nest and afford a curtain between the nest and egg-collecting chamber.

Similar figures of reference designate similar parts or features, as the case may be, wherever they occur.

In the drawings, 10 designates a box that may be made of wood or sheet metal, of suitable size, and of rectangular form, if made of wood, or with rounded ends somewhat like a common wash-boiler, if made of sheet metal, or it may be of any other suitable shape.

Considering the wooden box shown in Figs. 1 to 4 inclusive, it is divided into a nest compartment 11 and an egg-collecting chamber 12 by a partition 13 that extends from the top scarcely half-way down toward the bottom of the box. The division into two compartments by the partition 13 leaves the nest chamber larger than the egg-collecting chamber 12, it not being necessary to make the latter as large as the former. Into the chamber 12, so formed, I place a little hay or straw so that the eggs will not be broken by being dropped or rolled on a hard bottom. The nest in the nest compartment I make and line with coarse hay or soft straw 14, tied to a cross-slat 14' or other means at the top of the nest, and arranged on the partition side so as to hang down below the bottom of the partition, completing the latter between the nest and the egg-collecting compartment. On the opposite side of the nest from the partition the hay 14 extends from the top of the box where it is made fast down the sides, on the bottom and under the pendent ends of the hay at the partition into the egg-collecting chamber. The bottom of the nest will be formed so that it will incline toward the bottom of the partition for a reason to be presently stated. The nest egg 15 will be tied in place in the nest compartment so as to keep it in place by means of a cord, 18, attached at one end to the egg and at the other end to the side of the box. Under this construction, a nest of hay will be formed that no hen will shun, and in laying an egg therein it will immediately roll down the inclined bottom 16 of hay under the pendent ends 14 forming the bottom part of the partition onto the hay in the egg-collecting compartment 12.

In Fig. 7, there is shown on an enlarged scale the position of the slat or rod 14' relatively to the side of the box 10 to which it may be nailed, and the hay or straw 14 that forms the lining to the nest and the curtain hanging below the partition 13. The hay or straw 14 is simply hung upon the slat or rod 14 and left to depend therefrom to line the sides of the nest and form the curtain as stated. Of course the lining for the bottom of the nest may be placed therein and connected with the hay hanging from the slats by becoming entangled therewith.

The top of the egg-collecting compartment 12 may be closed by a hinged cover or lid 17 through which the eggs may be gathered from the chamber or compartment 12, or an opening may be left in the side of the chamber 12, closed by a door 18, by which access can be had to the eggs to gather them without disturbing a hen on the nest.

In the form of the invention shown in Figs. 6 and 7, there is a nest in each end of the box and a single egg-collection chamber for both constructed between them. Otherwise the construction is the same as that shown with reference to Figs. 1 to 4 inclusive.

Under these improvements a trap-nest is easily and cheaply made, and being formed of and lined with hay it may be easily renovated and replenished when required. The portion of the partition formed of hay may check the force of the egg as it rolls down from the nest into the chamber 12, but it will not stop nor break the egg. The partition or curtain of hay may extend entirely to the bottom of the nest compartment so as to completely hide the eggs in the egg-collecting chamber and still it will not stop the eggs from rolling through it. This is an important feature of the invention.

What is claimed as the invention, is:—

An egg-trapping hen's nest consisting of a box provided with a rigid partition extending from the top a short way down toward the bottom, dividing the box into a nest and an egg-receiving compartment, hay secured to the top of the nest compartment forming the nest lining, bottom of the nest, and bottom of the egg-receiving compartment, the hay also depending from the top of the nest below the rigid partition to or nearly to the bottom of the box completing the partition and forming a curtain serving to hide the eggs in the egg-receiving chamber, but permitting the fresh-laid eggs to roll through it without danger of breakage into the last-mentioned chamber.

In testimony whereof, I affix my signature, in presence of two witnesses.

FRIEDRICH C. B. HILKEMEIER.

Witnesses:
A. LOOMIS,
H. N. POOL.